(12) United States Patent
Katsushima et al.

(10) Patent No.: US 10,794,746 B2
(45) Date of Patent: Oct. 6, 2020

(54) FIELD DEVICE AND FIELD DEVICE MANAGEMENT SYSTEM

(71) Applicants: Yokogawa Electric Corporation, Tokyo (JP); Rota Yokogawa GmbH & Co. KG, Wehr (DE)

(72) Inventors: Soichiro Katsushima, Tokyo (JP); Janus Slotwinski, Wehr (DE); Yoshihiro Chiken, Tokyo (JP)

(73) Assignees: Yokogawa Electric Corporation, Musashino-shi, Tokyo (JP); Rota Yokogawa GmbH & Co. KG, Wehr (DE)

( * ) Notice: Subject to any disclaimer, the term of this patent is extended or adjusted under 35 U.S.C. 154(b) by 367 days.

(21) Appl. No.: 15/872,134

(22) Filed: Jan. 16, 2018

(65) Prior Publication Data

US 2018/0202849 A1 Jul. 19, 2018

(30) Foreign Application Priority Data

Jan. 18, 2017 (JP) .................................. 2017-007096

(51) Int. Cl.
| | | |
|---|---|---|
| *G06F 11/30* | (2006.01) | |
| *G01F 1/84* | (2006.01) | |
| *G01F 1/74* | (2006.01) | |
| *G01N 9/00* | (2006.01) | |

(52) U.S. Cl.
CPC .............. *G01F 1/8436* (2013.01); *G01F 1/74* (2013.01); *G01N 9/002* (2013.01); *G01N 2009/006* (2013.01)

(58) Field of Classification Search
CPC .................................................... G01F 1/8436
See application file for complete search history.

(56) References Cited

U.S. PATENT DOCUMENTS

| | | |
|---|---|---|
| 6,327,914 B1 | 12/2001 | Dutton |
| 2008/0252283 A1 | 10/2008 | McAnally et al. |
| 2010/0134304 A1* | 6/2010 | Weinstein ................. G01F 1/74 340/632 |

FOREIGN PATENT DOCUMENTS

| | | |
|---|---|---|
| JP | 3547708 B2 | 7/2004 |
| WO | 00/19175 A1 | 4/2000 |

OTHER PUBLICATIONS

Wikipedia: "Sample size determination", Dec. 13, 2016 (8 pages total).
Tom O'Banion: "Coriolis: The Direct Approach to Mass Flow Measurement", Chemical Engineering Progress, Mar. 1, 2013, pp. 41-46 (6 pages total).
Akira Uehara et al: "Diagnosis of aerated flow at water line with Coriolis flowmeter using Hilbert Transform", SICE Annual Conference 2010, Proceedings of, IEEE, Piscataway, Aug. 18, 2010, pp. 1682-1687 (6 pages total).

* cited by examiner

*Primary Examiner* — Phuong Huynh
(74) *Attorney, Agent, or Firm* — Sughrue Mion, PLLC (57) ABSTRACT

A field device configured to measure a state amount of a fluid as a measured value, the field device includes a slug flow detector configured to detect an occurrence of a slug flow, and a controller configured to hold a hold value of the measured value if the occurrence of the slug flow is detected by the slug flow detector, the hold value being a value based on at least one measured value in a predetermined period from a predetermined time before a time at which the slug flow has been detected.

18 Claims, 7 Drawing Sheets

FIELD DEVICE AND FIELD DEVICE MANAGEMENT SYSTEM

BACKGROUND

Technical Fields

The present invention relates to a field device and a field device management system.

Priority is claimed on Japanese Patent Application No. 2017-007096, filed Jan. 18, 2017, the contents of which are incorporated herein by reference.

Related Art

Field devices are installed in facilities such as plants and factories. For example, as an example of a field device, there is a flowmeter for measuring a flow rate of a fluid used in facilities.

Here, if air bubbles are mixed into a liquid of a measured fluid due to effects of a slug flow when a field device for measuring the flow rate of a fluid measures a flow rate, an error may occur in a measured value in some cases. For example, if air bubbles are mixed in the liquid of a measured fluid due to the effects of a slug flow in a Coriolis mass flow rate meter which is a type of the field device, it is known that a density value of the measured fluid which is a measured value decreases (refer to Japanese Patent No. 3547708).

In order to solve this problem, when occurrence of a slug flow is detected in a conventional Coriolis mass flow rate meter, the error described above occurring due to a slug flow is prevented from occurring by using a density value from immediately before detection of the slug flow.

However, in a conventional Coriolis mass flow rate meter, a slug flow may have already occurred when it is detected. Therefore, when the occurrence of a slug flow is detected, even if a density value from immediately before detection of the slug flow is used, the density value may be affected by the slug flow. For this reason, a density value cannot be measured correctly when a slug flow occurs in some cases in an application requiring more accurate measurement of density values.

Such a problem is not a problem limited to a Coriolis mass flow rate meter, and is also a problem common to field devices in which an error occurs in a measured value due to occurrence of a slug flow.

SUMMARY

A field device configured to measure a state amount of a fluid as a measured value, the field device may include a slug flow detector configured to detect an occurrence of a slug flow, and a controller configured to hold a hold value of the measured value if the occurrence of the slug flow is detected by the slug flow detector, the hold value being a value based on at least one measured value in a predetermined period from a predetermined time before a time at which the slug flow has been detected.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a field device and a field device management system which can measure a state value for a fluid, and can acquire more accurate measured values even when a slug flow has occurred.

Hereinafter, the present invention will be described using an embodiment of the invention, but the following embodiment does not limit the invention according to the claims, In addition, not all combinations of features described in the embodiment are necessary in the solution means of the invention. In the drawings, the same or similar portions are given the same reference numerals and duplicated description thereof may be omitted. In addition, shapes, sizes, and the like of elements in the drawings may be exaggerated for clear illustration.

In the entire specification, with reference to "including", "having", or "comprising" a component as a certain portion, this does not mean that other components are excluded, but means that other components can also be included unless otherwise stated.

Hereinafter, a field device according to one embodiment of the present invention will be described with reference to drawings.

The field device according to one embodiment of the present invention measures a flow rate of a fluid flowing in a pipe. In the following description, a Coriolis mass flow rate meter as the field device will be described as an example. That is, a Coriolis mass flow rate meter is an example of the field device.

Figure 1:
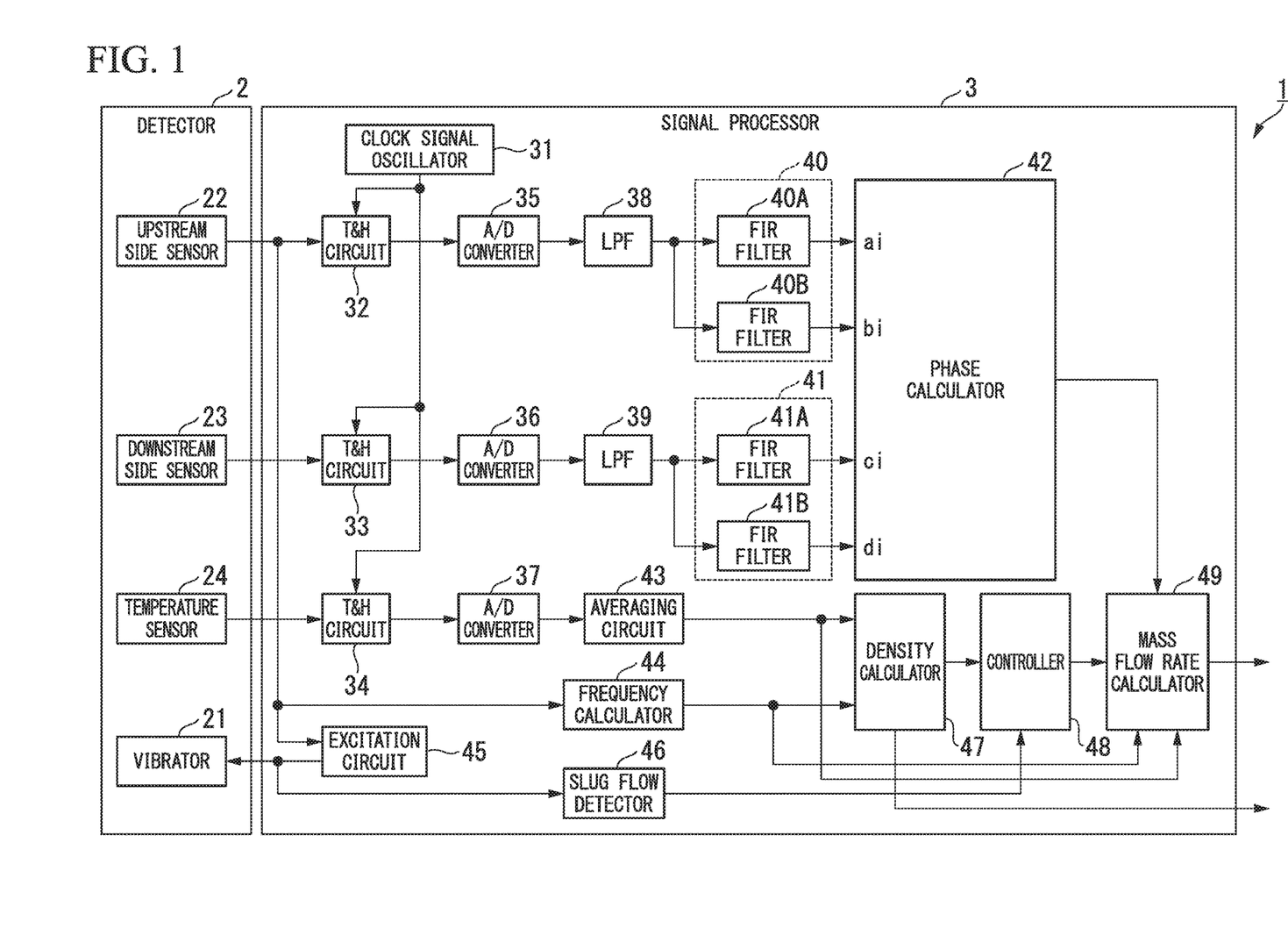
FIG. 1 is a diagram which shows an example of a schematic configuration of a field device according to one embodiment of the present invention.

As shown in FIG. 1, a field device 1 includes a detector 2 and a signal processor 3.

Figure 2:
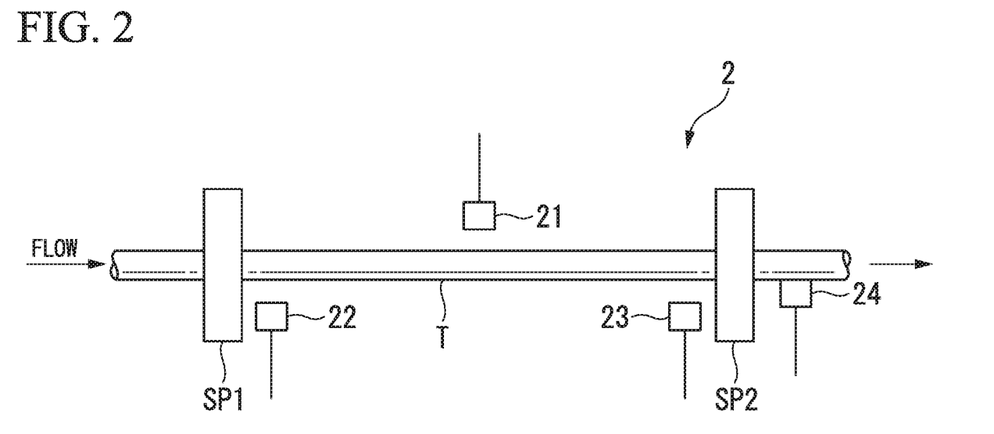
FIG. 2 is a diagram which shows an example of a schematic configuration of a detector 2 according to one embodiment of the present invention.

The detector 2 vibrates a measuring tube T (refer to FIG. 2) through which a fluid to be measured (measured fluid)

flows and detects vibrations and temperatures of the measuring tube T upstream and downstream from the measuring tube T.

As shown in FIG. 2, the detector 2 includes a vibrator 21, an upstream side sensor 22, a downstream side sensor 23, and a temperature sensor 24.

The vibrator 21 causes mechanical vibration of the measuring tube T in a vertical direction.

The vibrator 21 is provided around the measuring tube T through which a fluid flows. For example, the vibrator 21 is installed in the vicinity of a center of the measuring tube T. The vibrator 21 may be electrically connected to the signal processor 3. In the present embodiment, the measuring tube T is a straight pipe type tube of which both ends thereof are fixedly supported by the support members SP1 and SP2. However, the measuring tube T may also have another shape such as that of a U-shaped tube type.

The upstream side sensor 22 is a sensor which detects vibrations of the measuring tube T and is fixed in the vicinity of the support member SP1. The downstream side sensor 23 is a sensor which detects vibrations of the measuring tube T and is fixed in the vicinity of the support member SP2.

Each of the upstream side sensor 22 and the downstream side sensor 23 is electrically connected to the signal processor 3.

The temperature sensor 24 is fixed on the measuring tube T in the vicinity of the support member SP2. The temperature sensor 24 is electrically connected to the signal processor 3. This temperature sensor 24 is used to prevent a measurement error in mass flow rate and density value due to temperature fluctuation.

In the following, operations of the detector 2 constituted as described above will be described with reference to FIG. 3.

The vibrator 21 vibrates the measuring tube T in a predetermined vibration mode in accordance with a driving current $I_R$ output from the signal processor 3. For example, the vibrator 21 vibrates the measuring tube T in, for example, a primary mode denoted by reference numerals M1 and M2 in FIG. 3 (a vibration mode in which a vibration node appears only in a portion fixedly supported by the support members SP1 and SP2).

Figure 3:
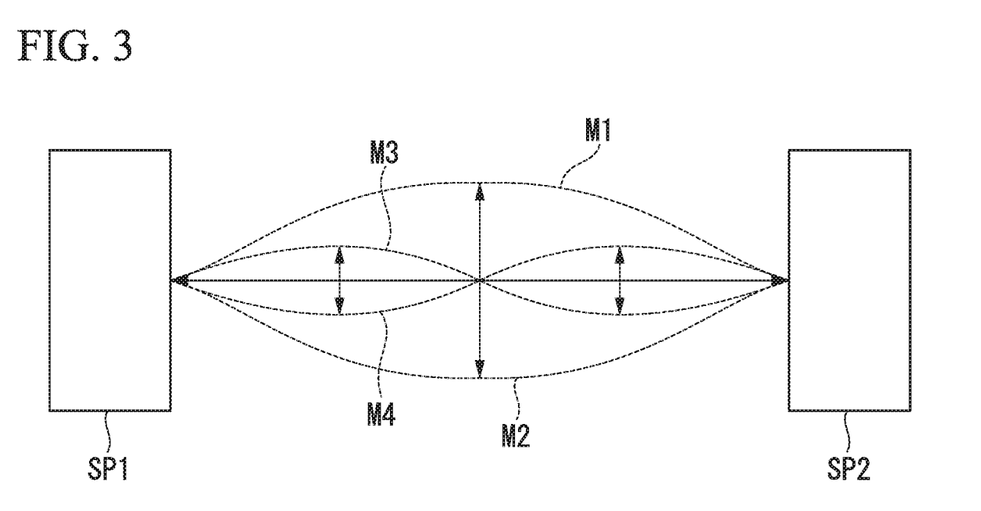
FIG. 3 is a diagram which describes an operation principle of the detector 2 according to one embodiment of the present invention.

If a measured fluid flows through the measuring tube T with vibration being applied to the measuring tube T in the primary mode by the vibrator 21, the measuring tube T vibrates in, for example, a secondary mode denoted by reference numerals M3 and M4 in FIG. 3 (a vibration mode in which a vibration node appears in the portion fixedly supported by the support members SP1 and SP2 and at an intermediate position therebetween). The measuring tube T actually vibrates in a vibration mode in which two types of vibration modes such as the primary mode and the secondary mode are superimposed.

The upstream side sensor 22 measures a displacement amount on an upstream side of the measuring tube T which vibrates in the vibration mode described above. The upstream side sensor 22 outputs a measured displacement amount to the signal processor 3 as a displacement signal SA.

The downstream side sensor 23 detects a displacement amount on a downstream side of the measuring tube T described above. The downstream side sensor 23 outputs a detected displacement amount to the signal processor 3 as a displacement signal SB.

The temperature sensor 24 measures a surface temperature of the measuring tube T. The temperature sensor 24 outputs the measured surface temperature of the measuring tube T to the signal processor 3 as a temperature signal ST1.

Next, the signal processor 3 according to one embodiment of the present invention will be described.

The signal processor 3 obtains a mass flow rate of a measured fluid flowing through the measuring tube T based on a phase difference between the detection signals SA and SB detected by the detector 2. In addition, the signal processor 3 measures a vibration frequency of the measuring tube T based on at least one of the detection signal SA and the detection signal SB. Then, the signal processor 3 measures the mass of a measured fluid, that is, a density value based on a measured vibration frequency.

As shown in FIG. 1, the signal processor 3 includes a clock signal oscillator 31, track and hold (T&H) circuits 32 to 34, analog/digital converters (A/D converters) 35 to 37, low pass filters (LPF) 38 and 39, Hilbert converters 40 and 41, a phase calculator 42, an averaging circuit 43, a frequency calculator 44, an excitation circuit 45, a slug flow detector 46, a density calculator (measured value calculator) 47, a controller 48, and a mass flow rate calculator 49.

The clock signal oscillator 31 generates a timing signal $T_C$ having a predetermined sampling period regardless of vibration of the measuring tube T.

The T&H circuit 32 is connected to the upstream side sensor 22. The T&H circuit 32 acquires a displacement signal SA output from the upstream side sensor 22. The T&H circuit 32 sequentially samples and holds the displacement signal SA at N time points in each cycle based on the timing signal $T_C$. The detection signal SA held by the T&H circuit 32 is output the A/D converter 35. The displacement signal SA is output to the track and hold (T&H) circuit 18 in a form of, for example, $A \cdot \sin(\omega t_0)$, and is sequentially sampled and held at N time points of each cycle in the displacement signal SA according to the timing signal $T_C$ which determines a sampling time point. Here, A indicates an amplitude, w indicates an angular frequency, and $t_0$ indicates an arbitrary time point.

The A/D converter 35 sequentially converts the displacement signal SA held by the T&H circuit 32 into a digital signal DA2 and outputs a result to the LPF 38 which performs processing in a digital format.

The LPF 38 removes a frequency component higher than those in the vicinity of the vibration frequency of a measuring tube from the digital signal DA2 digital-converted by the A/D converter 35, and outputs the signal obtained by removing the high frequency component to the Hilbert converter 40 as a digital signal DA3.

The Hilbert converter 40 includes a finite impulse response (FIR) filter 40A and a FIR filter 40B.

The FIR filter 40A is an in-phase digital filter which converts a signal into an output signal having the same phase as an input signal (the digital signal DA3). Specifically, the FIR filter 40A outputs a digital signal DA4 in a format of $A \cdot \sin(\omega t_0)$.

The FIR filter 40B is a phase shift digital filter which converts a signal into an output signal having a phase which is 90° different from an input signal (the digital signal DA3). The FIR filter 40B basically outputs a digital signal DA5 in a form of $A \cdot \cos(\omega t_0)$.

The T&H circuit 33 is connected to the downstream side sensor 23. The T&H circuit 33 acquires a displacement signal SB output from the downstream side sensor 23. The T&H circuit 33 sequentially samples and holds the displacement signal SB at N time points of each cycle based on the timing signal $T_C$. The detection signal SB held by the T&H circuit 33 is output to the A/D converter 36. The displacement signal SB is output to the track and hold (T&H) circuit 18 in a form of, for example, $B \cdot \sin(\omega t_0 + \Phi)$, and is here sequentially sampled and held at N time points of each cycle in the displacement signal SB according to the timing signal $T_C$ which determines a sampling time point. Here, B indicates an amplitude, and $\Phi$ indicates a phase difference for the displacement signal SA at a time point $t_0$.

The A/D converter 36 sequentially converts the displacement signal SB held by the T&H circuit 33 into the digital signal DB2, and outputs a result to the LPF 39 which performs processing in a digital format.

The LPG 39 removes a frequency component higher than those in the vicinity of the vibration frequency of a measuring tube from the digital signal DB2 digital-converted by the A/D converter 36, and outputs the signal obtained by removing the high frequency component to the Hilbert converter 41 as a digital signal DB3.

The Hilbert converter 41 includes a finite impulse response (FIR) filter 41A and a FIR filter 41B.

The FIR filter 41A is an in-phase digital filter which converts a signal into an output signal having the same phase as an input signal (the digital signal DB3). Specifically, the FIR filter 41A outputs a digital signal DB4 in a format of $B \cdot \sin(\omega t_0 + \Phi)$.

The FIR filter 41B is a phase shift digital filter which converts a signal into an output signal having a phase which is 90° different from an input signal (the digital signal DB3). The FIR filter 41B basically outputs a digital signal DB5 in a form of $B \cdot \cos(\omega t_0 + \Phi)$.

When a digital signal DA4 at a time $t_i$ is set as $a_i$, a digital signal DA5 is set as $b_i$, a digital signal DB4 is set as $c_i$, a digital signal DB5 is set as $d_i$, and a tangent signal for an average value of phase differences of a pair of Coriolis signals at times $t_1$ to $t_N$ is set as $\tan \Phi$, the phase calculator 42 obtains the $\tan \Phi$ by performing a calculation using $\tan \Phi = (\Sigma Ni=1(b_i c_i - a_i d_i))/(\Sigma Ni=1(a_i c_i + b_i d_i))$. The phase calculator 42 outputs the calculated $\tan \Phi$ to the mass flow rate calculator 49.

The T&H circuit 34 is connected to the temperature sensor 24. The T&H circuit 34 acquires the temperature signal ST1 output from the temperature sensor 24. The T&H circuit 34 holds the temperature signal ST1 and outputs the signal to the A/D converter 37 based on the timing signal $T_C$ which determines a sampling time point.

The A/D converter 37 sequentially converts the temperature signal ST1 held by the T&H circuit 34 into a digital signal and outputs the digital signal to the averaging circuit 43.

The averaging circuit 43 averages the signals digital-converted by the A/D converter 37 and outputs the averaged signal to the density calculator 47 and the mass flow rate calculator 49 as a temperature signal ST2.

As described above, the temperature signal ST1 is output to the T&H circuit 34 from the temperature sensor 24, multiple temperature signals ST1 held by the timing signal $T_C$ for detecting a sampling time point are converted into digital signals by the A/D converter 37 and output to the averaging circuit 43, and are here output to the density calculator 47 and the mass flow rate calculator 49 as an averaged temperature signal ST2.

The frequency calculator 44 calculates a signal frequency fA based on the displacement signal SA detected by the upstream side sensor 22. This signal frequency fA is a frequency of the displacement signal SA of the upstream side sensor 22, and is a frequency of vibration of the measuring tube T. The frequency calculator 44 outputs the calculated signal frequency fA to the density calculator 47 and the mass flow rate calculator 49. The frequency calculator 44 can calculate a signal frequency fA based on the displacement signal SB instead of the displacement signal SA.

The excitation circuit 45 is connected to the upstream side sensor 22. The excitation circuit 45 drives the vibrator 21, for example, in a sinusoidal shape by outputting a driving current $I_R$ in accordance with the displacement signal SA to the vibrator 21. The excitation circuit 45 is connected to the downstream side sensor 23 and drives the vibrator 21, for example, in a sinusoidal shape by outputting the driving current $I_R$ in accordance with the displacement signal SB to the vibrator 21.

The slug flow detector 46 detects occurrence of a slug flow. For example, the slug flow detector 46 detects occurrence of a slug flow based on the driving current $I_R$. Here, the occurrence of a slug flow means that air bubbles are mixed in a measured fluid by a slug flow. Specifically, when an amplitude of the displacement signal SA decreases due to the mixing in of air bubbles, the excitation circuit 45 increases the driving current $I_R$ so as to maintain a fixed amplitude (amplitude before a decrease). As a result, the slug flow detector 46 detects the occurrence of a slug flow when the driving current $I_R$ exceeds a threshold value $I_{th}$. Hysteresis is provided in this threshold value $I_{th}$. When the slug flow detector 46 detects the occurrence of a slug flow, the slug flow detector 46 outputs a slug detection signal indicating a result of the detection to the controller 48. Here, as another example of the slug flow, there is an annular flow, but in this annular flow, a liquid flows along a tube wall in the measuring tube T and a gas flows or is present in the center in the measuring tube T.

The density calculator 47 calculates a density value $D_S$ of a measured fluid in accordance with the following calculation expressions (1) and (2) based on the signal frequency fA and the temperature signal ST2, and outputs the density value $D_S$ to the controller 48. In the following calculation expressions (1) and (2), fr is a resonance frequency in a state in which the measuring tube T is full of a measured fluid at a reference temperature, $f_0$ is a resonance frequency in a state in which the measuring tube T is empty, and $K_1$ and $K_2$ are constants.

$$D_S = K_2(f_0^2 - fr^2)/fr^2 \quad (1)$$

$$fr = fA/(1 + K_1 \cdot ST2) \quad (2)$$

Figure 4:
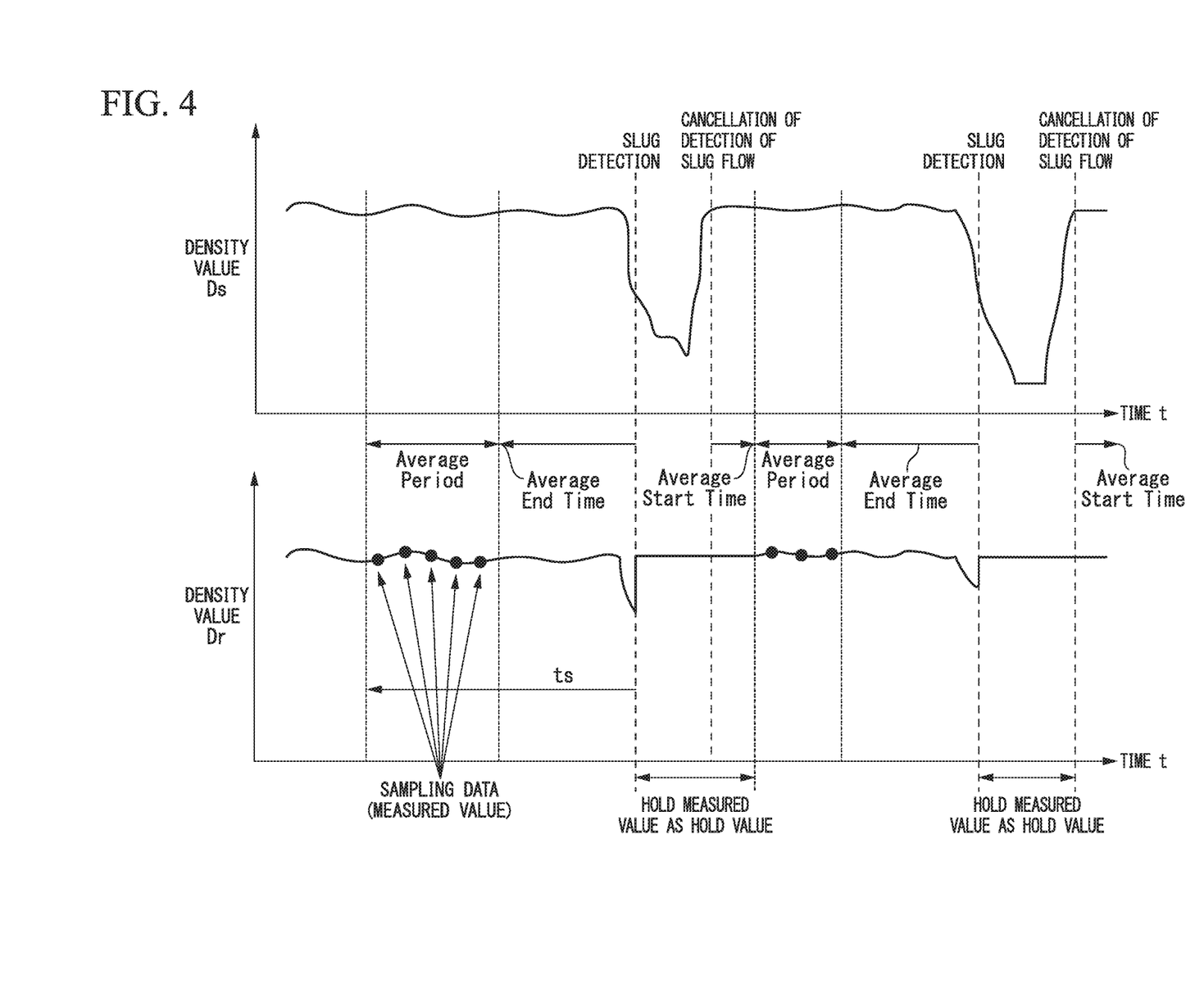
FIG. 4 is a diagram which describes an operation of a controller 48 according to one embodiment of the present invention.

Next, an operation of the controller 48 will be described using FIG. 4. FIG. 4 is a diagram which describes the operation of the controller 48 in one embodiment of the present invention. An upper diagram of FIG. 4 shows the density value $D_S$ calculated by the density calculator 47, and a lower diagram of FIG. 4 shows a density value Dr output based on the density value $D_S$ by the controller 48.

As shown in FIG. 4, when the occurrence of a slug flow is detected, the controller 48 holds a value based on at least one of the measured values in a predetermined average period (AP) from a predetermined time is before a time at which a slug flow is detected, which is before the detection of a slug flow, as a hold value of the measured value in a case in which a slug flow is detected. Here, as the value based on at least one of the measured values in the predetermined period AP, a measured value at an arbitrary measurement time point in the predetermined period AP may be used as a hold vale, and an average value of measured values at a plurality of arbitrary measurement time points, a center (middle) value, a most frequent value, and a dumped value may also be used as a hold value. The measured values at a plurality of arbitrary time points may be all measured values within the predetermined period AP, and may be measured values at some continuous measurement time points or measured values at some discontinuous measurement time points.

In the present embodiment, the controller 48 calculates an average value $D_h$ of satisfactory density values $D_S$ (measured values) as a value based on at least one measured value in the predetermined period average period (AP). Then, the controller 48 holds the calculated average value $D_h$ as a hold value of the measured value in the case in which a slug flow is detected. For example, the controller 48 outputs the average value $D_h$ to an external device and the mass flow rate calculator 49 as a density value Dr if the occurrence of a slug flow is detected. The controller 48 may also output the density value $D_S$ calculated by the density calculator 47 to an external device and the mass flow rate calculator 49 as a density value Dr if the occurrence of a slug flow is not detected. Here, the predetermined period AP is a period before the detection of a slug flow and is a period in which the density value $D_S$ is used in the averaging calculation. In the following description, the density value $D_S$ may be referred to as sampling data.

A time AET (Average End Time) shown in FIG. 4 is a time at which averaging calculation of the density value $D_S$ ends, and a time at which the period AP ends. The time AET is set to a time which is a predetermined time before the time at which a slug flow is detected.

In addition, a time AST (Average Start Time) is a time to start the averaging calculation of the density value $D_S$ after the detection of a slug flow is cancelled, and a setting thereof can be changed.

In a period from the time AET to the time AST, the detection of a slug flow and the averaging calculation of the density value $D_S$ may not be executed. However, the controller 48 outputs the average value $D_h$ to an external device and the mass flow rate calculator 49 as a density value Dr in this period.

That is, the controller 48 holds the density value Dr as a hold value of the measured value. Holding of the measured value may be performed in a period from the time at which a slug is detected to the time AST.

This is because the density value $D_S$ may still have an error with respect to a measured value even after air bubbles in a measured fluid decreases and detection of a slug flow is cancelled according to an application. In addition, in the case of an application which frequently repeats the detection of a slug flow and the cancellation of detection of a slug flow every few seconds, a sufficiently satisfactory density value $D_S$ may not be able to be measured. For this reason, a density value $D_S$ which is not satisfactory is used in this case, and there is an error from an actual density value. As a result, a result having an error is calculated in averaging calculation. The controller 48 in the present embodiment holds a density value Dr without calculating an average value $D_h$ for a certain period of time (from the cancellation of detection of a slug flow to the time AST) even after the detection cancellation of a slug flow, and thus accurate measurement of a density value is possible. Setting can be changed in a period from the time AET to the time AST, and this setting can be invalid (0 second).

Returning to FIG. 1, the mass flow rate calculator 49 calculates a mass flow rate $Q_M$ from the following calculation expression (3) based on a density value Dr, a signal frequency fA, a tan Φ, and a temperature signal ST2. In the following calculation expression (3), $K_3$ is a constant, f(ST2) is a temperature correction term, and f(Dr) is a density correction term.

$$Q_M = f(ST2) \cdot f(Dr) \cdot \tan \Phi / fA \quad (3)$$

Here, f(ST2) is a temperature correction term and f(Dr) is a density correction term. Then, the mass flow rate calculator 49 outputs a calculated mass flow rate $Q_M$ to an external device.

Next, the controller 48 according to one embodiment of the present invention will be described in detail.

Figure 5:
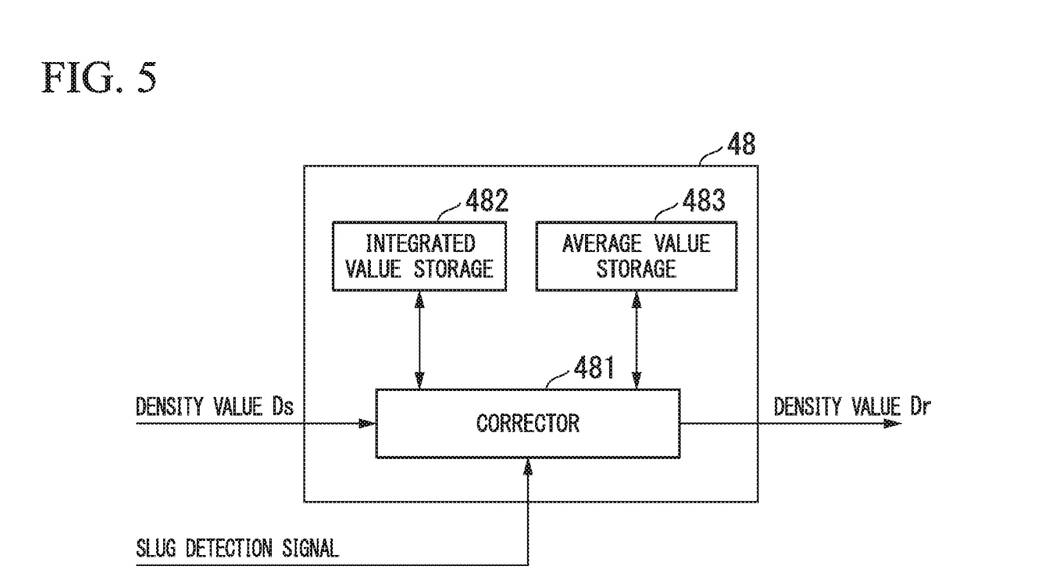
FIG. 5 is a diagram which shows an example of a schematic configuration of the controller 48 according to one embodiment of the present invention.

As shown in FIG. 5, the controller 48 includes a corrector 481, an integrated value storage 482, and an average value storage 483.

The corrector 481 calculates an average value $D_h$ using 500 latest satisfactory density values $D_S$ for each sampling period TD in the period AP when a sampling period TD of the field device 1 is 10 milliseconds and the number of pieces of data (the number of pieces of sampling data) L of the density value $D_S$ used in calculation of the average value $D_h$ is 500. Status information for determining whether the density value $D_S$ is satisfactory is correlated with the density value $D_S$ which is a measured value. For example, the status information is information indicating one of satisfactory, unsatisfactory, and uncertain statuses. For example, the status information indicating an unsatisfactory or uncertain status is for a case in which an error has occurred in processing of the field device 1 which is related to the measurement of a density value $D_S$. For this reason, these 500 pieces of data of the density values $D_S$ are used in the calculation of the average value $D_h$ only when they are determined to have satisfactory status information. The sampling period TD and the number of pieces of sampling data L can be appropriately changed.

For example, cases in which an error occurs in the processing of the field device 1 and a density value is unsatisfactory include a case in which abnormality occurs in backing up or restoring of a parameter used in the field device 1 and the backing up or restoring of a parameter has failed, a case in which an error has occurred in communication between a plurality of circuit boards or a plurality of processors in the field device 1 due to mismatch between hardware versions or a software versions in the field device 1, and the like. In addition, for example, cases in which a density value is uncertain include a case in which the measuring tube T of the detector 2 has corroded and the field device 1 detects the corrosion, a case in which, when the measuring tube T is empty or is not sufficiently filled with a measured fluid, and the field device 1 detects this state, and the like, and it may be unclear whether a measured value is normal in these cases.

However, as in the above examples, storing a large amount of data of density values $D_S$ in which the number of pieces of sampling data L is 500 at once may be difficult due to capacity restriction on a storage for storing this data. In such a case, the average value $D_h$ may be calculated in a data amount reduction method described below. In the following, the data amount reduction method according to one embodiment of the present invention will be described.

This data amount reduction method is a method of reducing a data amount stored in the file apparatus 1 by integrating density values $D_S$ for each sampling period TD in the period AP, and, when the number of pieces of data of the integrated density values $D_S$ reaches 500, calculating an average value $D_h$ by dividing the integrated value by 500.

Figure 6:
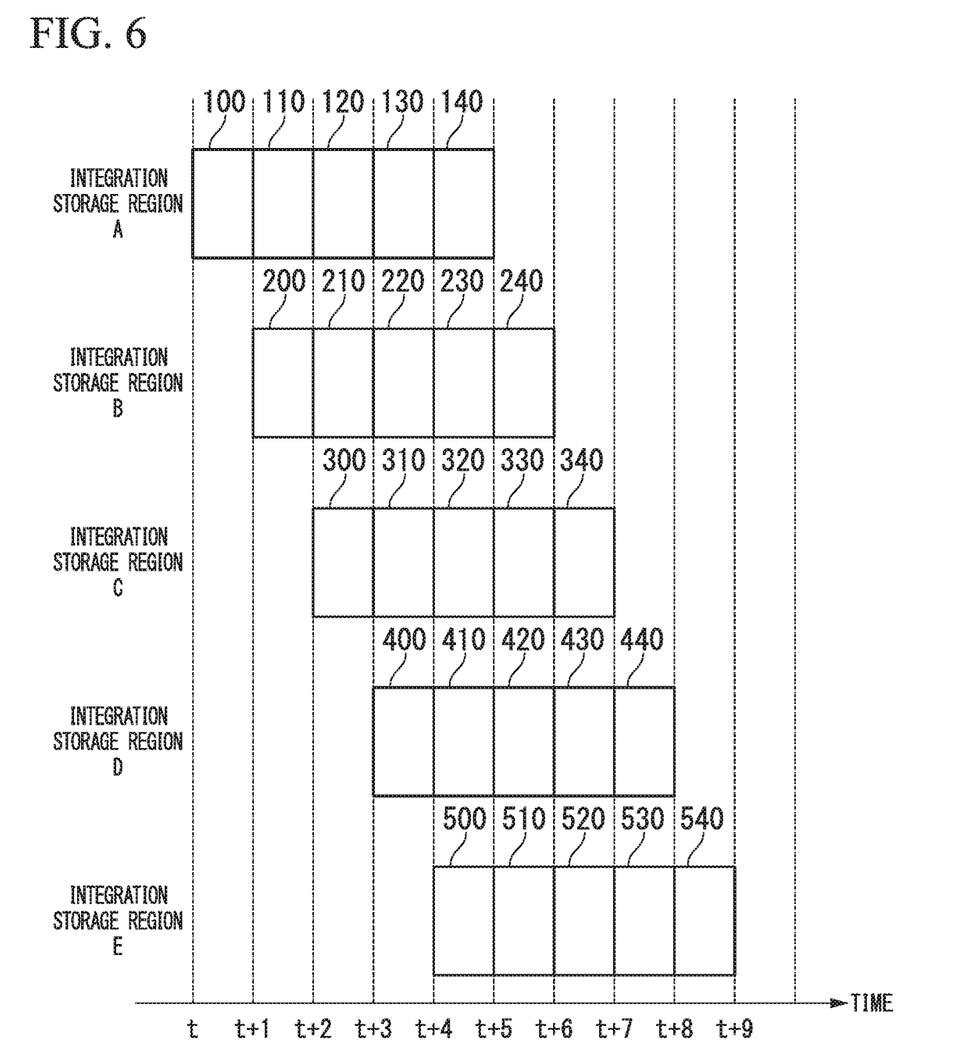
FIG. 6 is a diagram which shows an example of a schematic configuration of an integrated value storage 482 according to one embodiment of the present invention.

For example, as shown in FIG. 6, the integrated value storage 482 includes five integration storage regions A to E.

Then, each of the integration storage regions A to E includes five integration regions for storing an integrated value obtained by integrating 100 density values $D_S$. A horizontal axis in FIG. 6 represents time.

Specifically, an integration storage region A includes integration regions 100 to 140. An integration storage region B includes integration regions 200 to 240. An integration storage region C includes integration regions 300 to 340. An integration storage region D includes integration regions 400 to 440. An integration storage region E includes integration regions 500 to 540. In FIG. 6, the same integrated values are stored in integration storage regions corresponding to an individual time interval. That is, the same integrated values are stored in integration regions 110 and 200 corresponding to a time interval between a time t+1 and a time t+2. The same integrated values are stored in integration regions 120, 210, and 300 corresponding to a time interval between the time t+2 and a time t+3. The same integrated values are stored in integration regions 130, 220, 310, and 400 corresponding to a time interval between the time t+3 and a time t+4. The same integrated values are stored in integration regions 140, 230, 320, 410, and 500 corresponding to a time interval between the time t+4 and a time t+5. The same integrated values are stored in integration regions 240, 330, 420, and 510 corresponding to a time interval between the time t+5 and a time t+6. The same integrated values are stored in integration regions 340, 430, and 520 corresponding to a time interval between the time t+6 and a time t+7. The same integrated values are stored in integration regions 440 and 530 corresponding to a time interval between the time t+7 and a time t+8.

The corrector 481 calculates an integrated value for every 100 density values $D_S$, and stores the integrated value in the integration region 100. In addition, the corrector 481 stores the calculated integrated value in the integration region 100, moves an integrated value stored in the integration region 100 to the integration region 110, moves an integrated value stored in the integration region 110 to the integration region 120, moves an integrated value stored in the integration region 120 to the integration region 130, moves an integrated value stored in the integration region 130 to the integrated region 140, and delete an integrated value stored in the integration region 140.

Moreover, the corrector 481, for every 100 density values $D_S$, moves the integrated value stored in the integration region 100 to the integration region 200, moves an integrated value stored in the integration region 200 to the integration region 210, moves an integrated value stored in the integration region 210 to the integration region 220, moves an integrated value stored in the integration region 230 to the integration region 240, and deletes an integrated value stored in the integration region 240.

In addition, the corrector 481, for every 100 density values $D_S$, moves the integrated value stored in the integration region 200 to the integration region 300, moves an integrated value stored in the integration region 300 to the integration region 310, moves an integrated value stored in the integration region 310 to the integration region 320, moves an integrated value stored in the integration region 330 to the integration region 340, and deletes an integrated value stored in the integration region 340.

Moreover, the corrector 481, for every 100 density values $D_S$, moves the integrated value stored in the integration region 300 to the integration region 400, moves an integrated value stored in the integration region 400 to the integration region 410, moves an integrated value stored in the integration region 410 to the integration region 420, moves an integrated value stored in the integration region 430 to the integration region 440, and deletes an integrated value stored in the integration region 440.

In addition, the corrector 481, for every 100 density values $D_S$, moves the integrated value stored in the integration region 400 to the integration region 500, moves an integrated value stored in the integration region 500 to the integration region 510, moves an integrated value stored in the integration region 510 to the integration region 520, moves an integrated value stored in the integration region 530 to the integration region 540, and deletes an integrated value stored in the integration region 540.

In this manner, the corrector 481 moves an integrated value stored in an integration region to an integration region corresponding to a next time interval for every 100 density values $D_S$ (every one second).

Figure 7:
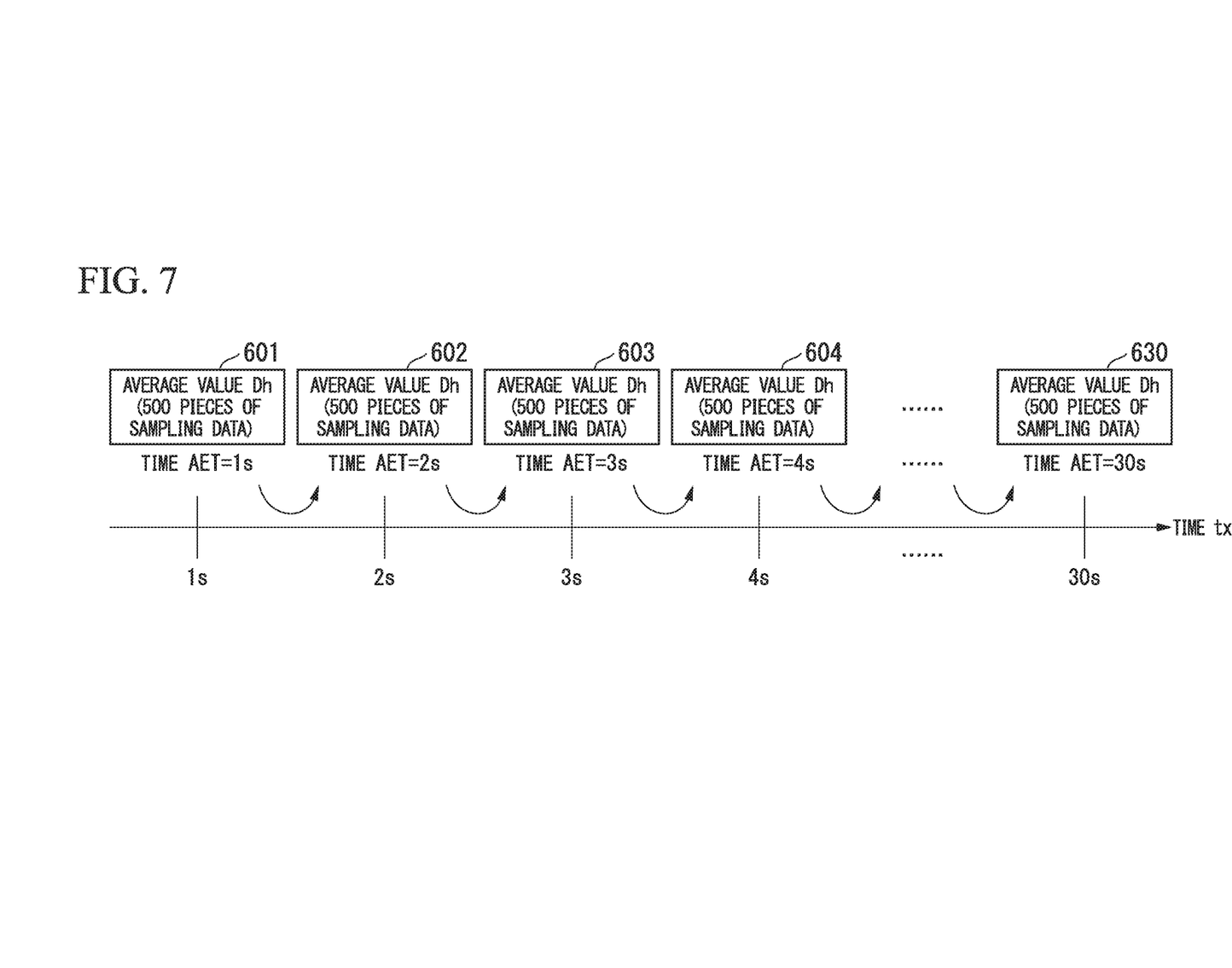
FIG. 7 is a diagram which shows an example of a schematic configuration of an average value storage 483 according to one embodiment of the present invention.

As shown in FIG. 7, the average value storage 483 includes an average value storage region in accordance with the time AET. Here, the time AET can be set by a user. In the present embodiment, a settable upper limit of the time AET is 30 seconds.

As a result, the average value storage 483 includes average value storage regions 601 to 630 for storing average values $D_h$ of each of one second to 30 seconds, and occasionally updates the average values $D_h$ stored in each of the average value storage regions 601 to 630 for every 100 density values $D_S$ (for each second).

For example, the corrector 481 stores 500 average values $D_h$ stored in the integrated value storage 482 in the average value storage region 601 for every 100 density values $D_S$. Specifically, the corrector 481 calculates an average value $D_h$ based on five integrated values stored in an integration storage region and stores the average value in the average value storage region 601 while changing the integration storage region in an order of the integration storage regions A, B, C, D, and E for every 100 density values $D_S$. As a result, the average values $D_h$ of 500 density values $D_S$ stored in the integrated value storage 482 are always stored in the average value storage region 601.

For example, when five integrated values have been collected in the integration storage region A, the corrector 481 calculates an average value $D_h$ of these five integrated values and stores the calculated average value $D_h$ in the average value storage region 601. The corrector 481 calculates an average value $D_h$ of five integrated values collected in the integration storage region B and stores the calculated average value $D_h$ in the average value storage region 601 one second after the average value $D_h$ for the integration storage region A is stored in the average value storage region 601. The corrector 481 calculates an average value $D_h$ of five integrated values collected in the integration storage region C and stores the calculated average value $D_h$ in the average value storage region 601 one second after the average value $D_h$ for the integration storage region B is stored in the average value storage region 601. The corrector 481 calculates an average value $D_h$ of five integrated values collected in the integration storage region D and stores the calculated average value $D_h$ in the average value storage region 601 one second after the average value $D_h$ for the integration storage region C is stored in the average value storage region 601. The corrector 481 calculates an average value $D_h$ of five integrated values collected in the integration storage region E and stores the calculated average value $D_h$ in the average value storage region 601 one second after the average value $D_h$ for the integration storage region D is stored in the average value storage region 601. Then, the corrector 481 calculates an average value $D_h$ of five integrated values collected in the integration storage region A and stores the calculated average value $D_h$ in the average value storage region 601 one second after the average value $D_h$ for the integration storage region E is stored in the average value storage region 601. In this manner, the corrector 481 calculates an average value $D_h$ based on five integrated values stored in an integration storage region and stores the calculated average value $D_h$ in the average value storage region 601 while changing the integration storage region in an order of the integration storage regions A, B, C, D, and E every one second, that is, every 100 density values $D_S$. Accordingly, in the present embodiment, the corrector 481 can calculate average values $D_h$ of 500 density values $D_S$ for every 100 density values $D_S$.

In addition, the corrector 481 moves the average values $D_h$ stored in the average value storage region 601 to average value storage regions in an order of the average value storage regions 602, 603, . . . , and 630 for every 100 density value $D_S$. In other words, the corrector 481 moves an average value $D_h$ stored in an average value storage region corresponding to a time tx to an average value storage region corresponding to a time tx+1 for every 100 density values $D_S$. Here, the time tx indicates a time which is a predetermined time before the time at which a slug flow is detected.

For example, a time tx=one second indicates a time which is one second before the time at which a slug flow is detected.

For example, the corrector 481, for every 100 density values $D_S$, moves an average value $D_h$ stored in the average value storage region 601 corresponding to the time tx=one second to an average value storage region 602 corresponding to a time tx=two seconds, moves an average value $D_h$ stored in the average value storage region 602 corresponding to the time tx=two seconds to an average value storage region 603 corresponding to a time tx=three seconds, and moves an average value $D_h$ stored in the average value storage region 603 corresponding to the time tx=three seconds to an average value storage region 604 corresponding to a time tx=four seconds. In this manner, the corrector 481 moves an average value $D_h$ stored in an average value storage region corresponding to each time tx=1, 2, . . . , and 29 seconds to an average value storage region corresponding to a time tx+1 for every 100 density values $D_S$ when the time AET is set to 30 seconds. Then, the corrector 481 deletes an average value $D_h$ stored in an average value storage region 630 corresponding to a time tx=30 seconds for every 100 density values.

The corrector 481 selects an average value storage region in accordance with the time AET among the average value storage regions 601 to 630, and outputs an average value $D_h$ stored in the selected average value storage region to an external device and the mass flow rate calculator 49 as a density value $D_r$. For example, when the time AET is set to three seconds, the average value storage region 603 which stores an average value $D_h$ when the time AET is three seconds is selected.

In this manner, when the number of density values $D_S$ which are measured values integrated in the integrated value storage 482 is equal to or greater than a predetermined value (for example, 100), the corrector 481 calculates an average value $D_h$ based on the integrated value and stores the average value $D_h$ in the average value storage 483. Accordingly, in the present embodiment, it is possible to suppress the number of regions required to calculate an average value $D_h$ to a total of 35 which are "the average value storage regions 601 to 630" and "the integration storage regions A to E".

Figure 8:
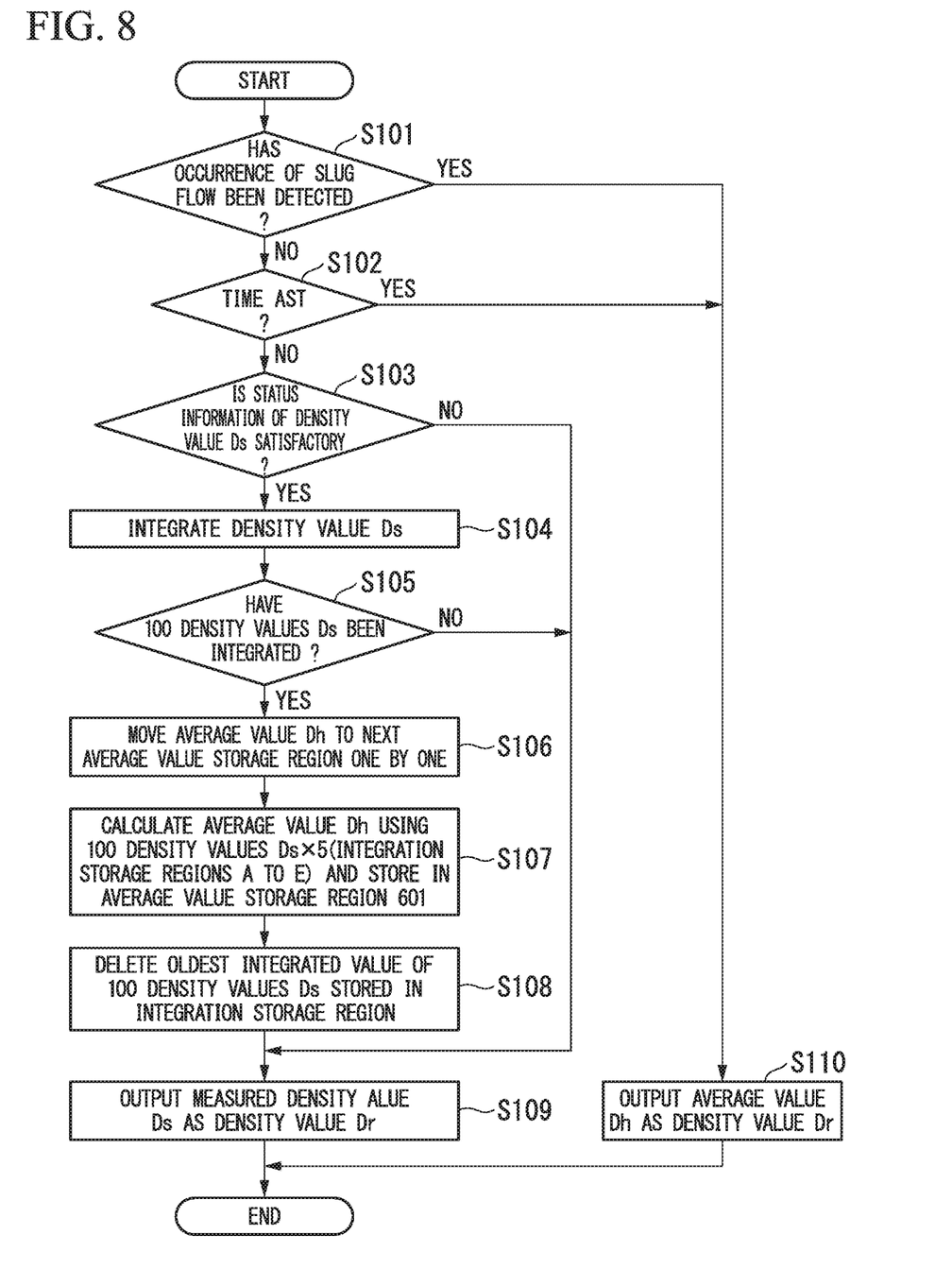
FIG. 8 is a diagram which shows a flow of the operation of the controller 48 according to one embodiment of the present invention.

Next, an operation of the controller 48 according to one embodiment of the present invention will be described using FIG. 8.

In the present embodiment, a series of operations shown as below is repeated for each sampling period TD.

The corrector 481 determines whether a slug flow has occurred (step S101). For example, the corrector 481 determines that a slug flow has occurred when a slug detection signal is acquired. When the corrector 481 determines that a slug flow has occurred, the procedure proceeds to processing of step S110.

When the corrector 481 determines that a slug flow has not occurred, the corrector 481 determines whether a current time is the time AST of the period AP (step S102). The corrector 481 determines whether the density value $D_S$ is satisfactory when a current time is not the time AST of the period AP (step S103). When the corrector 481 determines that a current time is the time AST of the period AP, the procedure proceeds to the processing of step S110.

If processing of step S103 results in YES, the corrector 481 integrates density values $D_S$ and stores the integrated value in the integrated value storage 482 (step S104). The corrector 481 proceeds to processing of step S109 if the processing of step S103 results in NO.

The corrector 481 determines whether 100 density values $D_S$ are integrated (step S105). When it is determined that 100 density values $D_S$ are integrated, the corrector 481 moves respective average values $D_h$ stored in the average value storage regions 601 to 630 at a time t to the average value storage regions 601 to 630 corresponding to a time t+1 (step S106). On the other hand, when it is not determined that 100 density values $D_S$ have been integrated, the corrector 481 executes the processing of step S109.

Then, the corrector 481 calculates the average value $D_h$ based on the integrated value of the density values $D_S$, which is stored in the integrated value storage 482, and stores the average value in the average value storage region 601 (step S107). Specifically, when the number of density values $D_S$ integrated in the integrated value storage 482 is equal to or greater than a predetermined value (100 in the present embodiment), the corrector 481 calculates an average value $D_h$ based on the integrated value and stores the average value $D_h$ in the average value storage region 601 of the average value storage 483.

The corrector 481 deletes the oldest integrated value in the integrated value storage 482 (step S108). The corrector 481 outputs a density value $D_S$ calculated by the density calculator 47 to an external device and the mass flow rate calculator 49 (step S109).

When it is determined that a slug flow has occurred, the corrector 481 selects an average value storage region in accordance with a set time AET among the average value storage regions 601 to 630, and outputs an average value $D_h$ stored in the selected average value storage region to an external device and the mass flow rate calculator 49 as a density value Dr.

As described above, the field device 1 according to the present embodiment is a field device configured to measure a state amount of a fluid as a measured value, and the field device includes a slug flow detector configured to detect an occurrence of a slug flow, and a controller configured to hold a hold value of the measured value if the occurrence of the slug flow is detected by the slug flow detector, the hold value being a value based on at least one measured value in a predetermined period from a predetermined time before a time at which the slug flow has been detected. As a result, when a slug flow has occurred, the field device 1 does not use a density value from immediately before the slug flow is detected. Accordingly, the field device 1 can acquire a more accurate measured value when a slug flow has occurred.

The present invention may be a field device management system including the field device 1 for measuring a state amount of a fluid as a measured value, and a control device (for example, DCS, AMS, PLC, and the like) for acquiring a measured value by communicating with the field device 1 wirelessly or by cable. In this case, the control device may acquire a measured value from the field device 1 and perform detection (a function of the slug detector) of a slug flow and calculation (a function of the controller 48) of an average value of the measured value. As a result, even when it is difficult for the field device 1 to hold a hold value of a measured value due to resource and performance problems, holding the hold value of a measured value can be performed by the control device acquiring a measured value from the field device 1. In the present embodiment, a case in which the field device 1 is applied to a Coriolis flowmeter has been described, but the field device 1 can also be applied to an electromagnetic flowmeter, a vortex flowmeter, a differential pressure flowmeter, and the like.

The signal processor 3 in the embodiment described above may be realized by a computer.

In this case, a program for realizing this function may be recorded on a computer readable recording medium, and the program recorded on this recording medium may be realized by being read and executed by a computer system. "Computer system" herein includes an OS and hardware such as peripheral devices. In addition, "computer readable recording medium" refers to a storage device such as a portable medium like a flexible disk, a magneto-optical disc, a ROM, or a CD-ROM or a hard disk embedded in the computer system. Furthermore, "computer readable recording medium" may include a device for dynamically holding a program for a short period of time like a communication line in the case of transmitting a program via a network such as the Internet or a communication circuit such as a telephone line, and a device for holding a program for a certain period of time like a volatile memory in the computer system serving as a server or a client in this case. In addition, the program described above may be a program for realizing a portion of the functions described above, furthermore may be a program which can realize the functions described above in combination with a program already recorded in the computer system, and may be a program realized using a programmable logic device such as a field programmable gate array (FPGA).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A field device configured to measure a state amount of a fluid as a measured value, the field device comprising:
    a slug flow detector configured to detect an occurrence of a slug flow; and
    a controller configured to hold a hold value of the measured value if the occurrence of the slug flow is detected by the slug flow detector, the hold value being a value based on at least one measured value in a predetermined period from a predetermined time before a time at which the slug flow has been detected,
    wherein the state amount is a density value,
    wherein the controller comprises a corrector configured to calculate an average value based on the density value, and
    wherein a time when the predetermined period ends is a time when the corrector ends a calculation of the average value, and the time when the predetermined period ends is set to a time which is a predetermined time before the time at which the slug flow has been detected.

2. The field device according to claim 1,
    wherein status information is correlated with the density value, and
    wherein the corrector is configured to determine whether the density value is satisfactory based on the status information, and the controller is configured to use only the density value determined as satisfactory for calculating the average value.

3. The field device according to claim 1,
    wherein the controller comprises:
    an integrated value storage which stores an integrated value of the density values measured in a predetermined sampling period; and
    an average value storage which stores the average value,
    wherein the corrector is configured to calculate the average value based on the integrated value, and configured to store the average value in the average value storage when a number of the density values used for integrating the integrated value stored in the integrated value storage is equal to or greater than a predetermined value.

4. The field device according to claim 1,
    wherein a time to start calculating the average value after a detection of the occurrence of the slug flow has been cancelled is settable.

5. The field device according to claim 1,
    wherein a number of the density values used for calculating the average value is settable.

6. A field device configured to measure a state amount of a fluid as a measured value, the field device comprising:
    a slug flow detector configured to detect an occurrence of a slug flow;
    a controller configured to hold a hold value of the measured value if the occurrence of the slug flow is detected by the slug flow detector, the hold value being a value based on at least one measured value in a predetermined period from a predetermined time before a time at which the slug flow has been detected;

a vibrator configured to vibrate a measuring tube in which the fluid flows;

an upstream side sensor configured to detect vibrations of the measuring tube to generate a first displacement signal;

a downstream side sensor which is disposed at a downstream of the upstream side sensor, and configured to detect vibrations of the measuring tube to generate a second displacement signal;

a frequency calculator configured to calculate a signal frequency indicating a frequency of any one of the first displacement signal and the second displacement signal;

a temperature sensor configured to measure a surface temperature of the measuring tube to generate first temperature signals;

an averaging circuit configured to average the first temperature signals generated by the temperature sensor to generate a second temperature signal; and a density calculator configured to calculate a density value of the fluid based on the signal frequency calculated by the frequency calculator and the second temperature signal generated by the averaging circuit.

7. The field device according to claim 6, further comprising:

a mass flow rate calculator configured to calculate a mass flow rate of the fluid, wherein the controller is configured to output the hold value to the mass flow rate calculator if the occurrence of the slug flow is detected by the slug flow detector, and the controller is configured to output the density value calculated by the density calculator to the mass flow rate calculator if the occurrence of the slug flow is not detected by the slug flow detector, and wherein the mass flow rate calculator is configured to calculate the mass flow rate of the fluid using the hold value or the density value output from the controller.

8. The field device according to claim 7, further comprising:

a phase calculator configured to calculate a tangent signal for an average value of phase differences of the first displacement signal generated by the upstream side sensor and the second displacement signal generated by the downstream side sensor, wherein the mass flow rate calculator is configured to calculate the mass flow rate of the fluid based on the hold value or the density value output from the controller, the signal frequency calculated by the frequency calculator, the second temperature signal generated by the averaging circuit, and the tangent signal calculated by the phase calculator.

9. The field device according to claim 8, further comprising:

a first Hilbert converter configured to convert the first displacement signal generated by the upstream side sensor into a first digital signal having the same phase as the first displacement signal and a second digital signal having a phase which is 90° different from the first displacement signal; and a second Hilbert converter configured to convert the second displacement signal generated by the downstream side sensor into a third digital signal having the same phase as the second displacement signal and a fourth digital signal having a phase which is 90° different from the second displacement signal, wherein the phase calculator is configured to calculate the tangent signal based on the first digital signal, the second digital signal, the third digital signal, and the fourth digital signal.

10. A field device management system comprising:

a field device configured to measure a state amount of a fluid as a measured value; and a control device configured to communicate with the field device to acquire the measured value, wherein the field device comprises:

a slug flow detector configured to detect an occurrence of a slug flow; and a controller configured to hold a hold value of the measured value if the occurrence of the slug flow is detected by the slug flow detector, the hold value being a value based on at least one measured value in a predetermined period from a predetermined time before a time at which the slug flow has been detected, wherein the state amount is a density value, wherein the controller comprises a corrector configured to calculate an average value based on the density value, and wherein a time when the predetermined period ends is a time when the corrector ends a calculation of the average value, and the time when the predetermined period ends is set to a time which is a predetermined time before the time at which the slug flow has been detected.

11. The field device management system according to claim 10, wherein status information is correlated with the density value, and wherein the corrector is configured to determine whether the density value is satisfactory based on the status information, and the controller is configured to use only the density value determined as satisfactory for calculating the average value.

12. The field device management system according to claim 10, wherein the controller comprises:

an integrated value storage which stores an integrated value of the density values measured in a predetermined sampling period; and an average value storage which stores the average value, wherein the corrector is configured to calculate the average value based on the integrated value, and configured to store the average value in the average value storage when a number of the density values used for integrating the integrated value stored in the integrated value storage is equal to or greater than a predetermined value.

13. The field device management system according to claim 10, wherein a time to start calculating the average value after a detection of the occurrence of the slug flow has been cancelled is settable.

14. The field device management system according to claim 10, wherein a number of the density values used for calculating the average value is settable.

15. A field device management system comprising:

a field device configured to measure a state amount of a fluid as a measured value; and a control device configured to communicate with the field device to acquire the measured value, wherein the field device comprises:
a slug flow detector configured to detect an occurrence of a slug flow; and
a controller configured to hold a hold value of the measured value if the occurrence of the slug flow is detected by the slug flow detector, the hold value being a value based on at least one measured value in a predetermined period from a predetermined time before a time at which the slug flow has been detected,
wherein the field device management system further comprises:
a vibrator configured to vibrate a measuring tube in which the fluid flows;
an upstream side sensor configured to detect vibrations of the measuring tube to generate a first displacement signal;
a downstream side sensor which is disposed at a downstream of the upstream side sensor, and configured to detect vibrations of the measuring tube to generate a second displacement signal;
a frequency calculator configured to calculate a signal frequency indicating a frequency of any one of the first displacement signal and the second displacement signal;
a temperature sensor configured to measure a surface temperature of the measuring tube to generate first temperature signals;
an averaging circuit configured to average the first temperature signals generated by the temperature sensor to generate a second temperature signal; and
a density calculator configured to calculate a density value of the fluid based on the signal frequency calculated by the frequency calculator and the second temperature signal generated by the averaging circuit.

16. The field device management system according to claim 15, further comprising:
a mass flow rate calculator configured to calculate a mass flow rate of the fluid,
wherein the controller is configured to output the hold value to the mass flow rate calculator if the occurrence of the slug flow is detected by the slug flow detector, and the controller is configured to output the density value calculated by the density calculator to the mass flow rate calculator if the occurrence of the slug flow is not detected by the slug flow detector, and
wherein the mass flow rate calculator is configured to calculate the mass flow rate of the fluid using the hold value or the density value output from the controller.

17. The field device management system according to claim 16, further comprising:
a phase calculator configured to calculate a tangent signal for an average value of phase differences of the first displacement signal generated by the upstream side sensor and the second displacement signal generated by the downstream side sensor,
wherein the mass flow rate calculator is configured to calculate the mass flow rate of the fluid based on the hold value or the density value output from the controller, the signal frequency calculated by the frequency calculator, the second temperature signal generated by the averaging circuit, and the tangent signal calculated by the phase calculator.

18. The field device management system according to claim 17, further comprising:
a first Hilbert converter configured to convert the first displacement signal generated by the upstream side sensor into a first digital signal having the same phase as the first displacement signal and a second digital signal having a phase which is 90° different from the first displacement signal; and
a second Hilbert converter configured to convert the second displacement signal generated by the downstream side sensor into a third digital signal having the same phase as the second displacement signal and a fourth digital signal having a phase which is 90° different from the second displacement signal,
wherein the phase calculator is configured to calculate the tangent signal based on the first digital signal, the second digital signal, the third digital signal, and the fourth digital signal.

* * * * *